(12) United States Patent
Strogov et al.

(10) Patent No.: US 11,436,328 B1
(45) Date of Patent: Sep. 6, 2022

(54) SYSTEMS AND METHODS OF SAFEGUARDING USER DATA

(71) Applicant: Acronis International GmbH, Shaffhausen (CH)

(72) Inventors: Vladimir Strogov, Moscow (RU); Nikolay Grebennikov, Moscow (RU); Serguei Beloussov, Costa Del Sol (SG); Mark Shmulevich, Moscow (RU); Stanislav Protasov, Moscow (RU); Eugene Aseev, Moscow Region (RU)

(73) Assignee: ACRONIS INTERNATIONAL GMBH ( * ) Notice: Subject to any disclaimer, the term of this patent is extended or adjusted under 35 U.S.C. 154(b) by 0 days.

(21) Appl. No.: 15/903,248

(22) Filed: Feb. 23, 2018

Related U.S. Application Data

(60) Provisional application No. 62/463,304, filed on Feb. 24, 2017.

(51) Int. Cl.
G06F 21/56 (2013.01)
G06F 11/14 (2006.01)
G06F 16/11 (2019.01)
G06F 16/17 (2019.01)

(52) U.S. Cl.
CPC ........ *G06F 21/565* (2013.01); *G06F 11/1469* (2013.01); *G06F 16/128* (2019.01); *G06F 16/1734* (2019.01); *G06F 2201/805* (2013.01); *G06F 2201/84* (2013.01); *G06F 2221/034* (2013.01)

(58) Field of Classification Search
CPC ...... G06F 21/554; G06F 21/56; G06F 21/566; G06F 21/568; G06F 11/1451; G06F 21/565; G06F 11/1469; G06F 2201/84; G06F 2201/805; G06F 2221/034; H04L 63/101; H04L 63/145
See application file for complete search history.

(56) References Cited

U.S. PATENT DOCUMENTS

| 7,047,380 | B2 | 5/2006 | Tormasov et al. |
| 7,246,211 | B1 | 7/2007 | Beloussov et al. |
| 7,275,139 | B1 | 9/2007 | Tormasov et al. |
| 7,281,104 | B1 | 10/2007 | Tsypliaev et al. |
| 7,318,135 | B1 | 1/2008 | Tormasov et al. |
| 7,353,355 | B1 | 4/2008 | Tormasov et al. |
| 7,366,859 | B2 | 4/2008 | Per et al. |
| 7,475,282 | B2 | 1/2009 | Tormasov et al. |

(Continued)

*Primary Examiner* — Joseph O Schell
(74) *Attorney, Agent, or Firm* — K&L Gates LLP

(57) ABSTRACT

Methods and systems for safeguarding against malware such as ransomware are described. In part, the disclosure relates to systems and methods for restoring user data and other data encrypted by malware or otherwise rendered inaccessible thereby. In one embodiment, the disclosure relates to a method of safeguarding user data. The method includes monitoring a plurality of processes executing on a computing device; detecting when a first process of the plurality of processes attempts to modify one or more parameters of a user data file; determining if first process is a trusted process or an untrusted process using one or more heuristics; and if the first process is determined to be an untrusted process, create a backup version of the user data file, wherein the backup version of the user data file is created with regard to an unchanged version the user data file.

20 Claims, 5 Drawing Sheets

(56) References Cited

U.S. PATENT DOCUMENTS

| | | |
|---|---|---|
| 7,603,533 B1 | 10/2009 | Tsypliaev et al. |
| 7,636,824 B1 | 12/2009 | Tormasov |
| 7,650,473 B1 | 1/2010 | Tormasov et al. |
| 7,721,138 B1 | 5/2010 | Lyadvinsky et al. |
| 7,779,221 B1 | 8/2010 | Tsypliaev et al. |
| 7,831,789 B1 | 11/2010 | Per et al. |
| 7,886,120 B1 | 2/2011 | Tormasov |
| 7,895,403 B1 | 2/2011 | Tormasov et al. |
| 7,899,788 B2 | 3/2011 | Chandhok et al. |
| 7,934,064 B1 | 4/2011 | Per et al. |
| 7,937,612 B1 | 5/2011 | Lyadvinsky et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,046,550 B2 | 10/2011 | Feathergill |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Lyadvinsky et al. |
| 8,261,035 B1 | 9/2012 | Tsypliaev et al. |
| 8,296,264 B1 | 10/2012 | Yeresov et al. |
| 8,312,259 B1 | 11/2012 | Dyatlov et al. |
| 8,347,137 B1 | 1/2013 | Chepel et al. |
| 8,484,427 B1 | 7/2013 | Goldobin et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,950,007 B1* | 2/2015 | Teal ................ G06F 21/554 726/30 |
| 8,996,830 B1 | 3/2015 | Goldobin et al. |
| 9,471,441 B1 | 10/2016 | Lyadvinsky et al. |
| 9,760,448 B1 | 9/2017 | Per et al. |
| 9,846,622 B1 | 12/2017 | Roguine et al. |
| 9,858,154 B1 | 1/2018 | Lyadvinsky et al. |
| 9,875,041 B1 | 1/2018 | Redko et al. |
| 9,922,192 B1* | 3/2018 | Kashyap ............. G06F 21/53 |
| 9,946,608 B1 | 4/2018 | Per et al. |
| 9,990,252 B1 | 6/2018 | Morlang et al. |
| 10,002,052 B1 | 6/2018 | Lyadvinsky et al. |
| 2003/0200459 A1* | 10/2003 | Seeman ............. G06F 21/10 726/26 |
| 2006/0236108 A1* | 10/2006 | Andrews ........... G06F 21/554 713/170 |
| 2010/0274983 A1* | 10/2010 | Murphy ........... G06F 11/1456 711/162 |
| 2013/0145463 A1* | 6/2013 | Ghosh ............... G06F 21/566 726/22 |
| 2014/0090077 A1* | 3/2014 | Jeong ................ G06F 21/60 726/26 |
| 2015/0058987 A1* | 2/2015 | Th .................... G06F 21/565 726/23 |
| 2015/0163231 A1* | 6/2015 | Sobko ............... H04L 63/1416 726/24 |
| 2016/0378988 A1* | 12/2016 | Bhashkar .......... G06F 21/566 726/24 |
| 2017/0185333 A1* | 6/2017 | Gauda .............. G06F 21/6218 |
| 2018/0075234 A1* | 3/2018 | Boutnaru ........... G06F 21/554 |
| 2018/0211038 A1* | 7/2018 | Breiman ........... G06F 11/14 |

\* cited by examiner

SYSTEMS AND METHODS OF SAFEGUARDING USER DATA

CROSS-REFERENCE TO RELATED APPLICATIONS

This application claims priority to and the benefit of U.S. Provisional Patent Application No. 62/463,304 filed on Feb. 24, 2017, the disclosure of which is herein incorporated by reference in its entirety.

TECHNICAL FIELD

The technical field may generally relate to data restoration and software protection and more particularly to safeguarding software applications and data from ransomware.

BACKGROUND

Ransomware is a category of malicious software or malware that is used to effectively hold a user's computer and/or data for ransom. Ransomware can prevent a user from logging into and using their computer or prevent certain applications from running. In addition, ransomware can encrypt files, such as family photos, password files, or other important sensitive information. Usually, ransomware is designed such that its creators can extort money from end users in order to regain access to their computer or decrypt the files maliciously encrypted by the ransomware.

According to some researchers, ransomware is fast becoming a ubiquitous security threat. A growing percentage of businesses are experiencing a ransomware-based attack. For many of these attacks, the ransomware encrypts user data and requires some money to decrypt.

Antivirus software protects against malware such as viruses but is not tailored for ransomware. Antivirus software operates with some inherent delays because it needs some time to recognize the malicious activities and characterize them as malware. Given that critical user files can be held for ransom as result of the delay, antivirus software provides a poor solution to combating ransomware.

The present application addresses this need and others.

BRIEF SUMMARY

In part, the disclosure relates to systems and methods for restoring user data and other data encrypted by malware or otherwise rendered inaccessible or unusable by such malware. In one embodiment, the disclosure relates to ransomware as a particular category of malware and methods of safeguarding user data therefrom. One or more anti-ransomware applications (AR) and components, algorithms, routines or modules thereof can be used to provide an anti-ransomware service (ARS). In general, the AR applications and ARS disclosed herein monitor for threats and implement strategies to safeguard end user data. These applications and services can be implemented using one or more agents or drivers in conjunction with one or more components of a backup and restore system or application.

In one embodiment, the AR service or applications includes a database (DB) with a list of known trusted processes. As a result, this database is referred to as a trusted database because the information stored in the databases is used to evaluate other processes or other data and identify such other processes or other data as trusted or safe. The trusted database can be used to determine that various data and processes are safe such that further processing and data backups are not necessary. This is contrast to the case in which malware is identified using an untrusted database or other heuristic approach. In general, in various embodiments, a single database can be used to store both trusted and untrusted records.

In one embodiment, the system includes a database with a list of known untrusted processes. As a result, this database is referred to as an untrusted/unsafe database because the information stored in the database is used to evaluate other processes or other data and identify such other processes or other data as untrusted or unsafe. The untrusted database can be used to flag various data and processes as unsafe. Accordingly, processes or data associated with ransomware or otherwise not identified as trusted by the trusted database can be flagged as a candidate for being associated with ransomware or other malware.

In one embodiment, the database of untrusted processes includes one or more identifiers for processes that are known to be or known to include malware features. Known ransomware processes would thus be included in the database. In one embodiment, the database is automatically updated or updated based on user feedback with new malware identifiers. In this way, the database of untrusted processes can remain up to date to safeguard user data.

In one embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of safeguarding user data on a computing device, the method includes: specifying one or more rules to identify one or more user files. The method of safeguarding user data also includes monitoring the one or more user files for attempts to change the one or more user files by a first process, wherein the first process is one of a plurality of processes executing on the computing device; detecting when the first process attempts to change a first user file of the one or more user files; determining if the first process is a trusted process or an untrusted process using one or more heuristics; and if the first process is determined to be an untrusted process, performing a first operation with respect to the first process or the first user file. Other embodiments of this aspect include corresponding computer systems, apparatus, and computer programs recorded on one or more computer storage devices, each configured to perform the actions of the methods.

In one embodiment, implementations of the method may include one or more of the following features. The method further includes generating a snapshot backup for each of the one or more user files being monitored pursuant to the one or more rules. In one embodiment, the method includes performing the first operation includes restoring the first user file using the snapshot back for the first user file. The method further includes restoring the first user file from a local backup or a cloud back if restoring the first user file with the snapshot fails. In one embodiment, the method includes performing the first operation includes terminating the first process if it is determined to be an untrusted process. In one embodiment, the method includes monitoring the one or more user files is performed by a file protection driver. In one embodiment, the one or more heuristics includes one or more databases including data identifying trusted process parameters or trusted processes. In one embodiment, the one or more heuristics includes one or more databases including data identifying untrusted process parameters or untrusted processes. In one embodiment, the one or more rules include one or more file masks. In one embodiment, the method includes detecting when the first process attempts to change a first user file includes receiving a write block of the first process, wherein the first process is a write process.

Additional method embodiments and features are as follows. In one embodiment, the method includes detecting when the first process attempts to change a first user file includes receiving an overwrite block of the first process wherein the first process is an overwrite process. In one embodiment, the method includes detecting when the first process attempts to change a first user file includes receiving a delete block of the first process wherein the first process is a delete process. In one embodiment, the method includes detecting when the first process attempts to change a first user file includes receiving a combination process block of the first process wherein the first process is a combination process. In one embodiment, the method includes detecting when the first process attempts to change a first user file includes receiving a first block of the first process wherein the first process is selected from the group consisting of a write process, an overwrite process, a delete process and a combination thereof, wherein the first block is selected from the group consisting of a write block, an overwrite block, a delete block, and a combination block or a combination thereof. The method further includes creating a backup file of the first user file in response to identifying that the first process is an untrusted process.

In one embodiment, a system includes processors that are further configured to generate a snapshot backup for each of the one or more user files being monitored pursuant to the one or more rules. In one embodiment, performing the first operation includes restoring the first user file using the snapshot back for the first user file. In one embodiment, the processors are further configured to restore the first user file from a local backup or a cloud back if restoring the first user file with the snapshot fails. In one embodiment, performing the first operation includes terminating the first process if it is determined to be an untrusted process. In one embodiment, monitoring the one or more user files is performed by a file protection driver executing on the one or more processors. In one embodiment, the one or more heuristics includes one or more databases including data identifying trusted process parameters or trusted processes, wherein the one or more databases are stored in the one or more memory devices. In one embodiment, the one or more heuristics includes one or more databases including data identifying untrusted process parameters or untrusted processes.

In one embodiment, the one or more rules include one or more file masks. In one embodiment, detecting when the first process attempts to change a first user file includes receiving a write block of the first process, wherein the first process is a write process. In one embodiment, the processors are further configured to create a backup file of the first user file in response to identifying that the first process is an untrusted process. Implementations of the described techniques may include hardware, a method or process, or computer software on a computer-accessible medium.

One general aspect of the disclosure includes a system for safeguarding user data. The system includes including one or more processors and one or more memory storage devices, wherein the one or more processors are configured to: specify one or more rules to identify one or more user files, wherein the rules are stored in the one or more memory storage devices. The system also includes one or more processors configured to monitor the one or more user files for attempts to change the one or more user files by a first process, wherein the first process is one of a plurality of processes executing on the one or more processors; detect when the first process attempts to change a first user file of the one or more user files; determine if the first process is a trusted process or an untrusted process using one or more heuristics; and if the first process is determined to be an untrusted process, perform a first operation with respect to the first process or the first user file. Other embodiments of this aspect include corresponding computer systems, apparatus, and computer programs recorded on one or more computer storage devices, each configured to perform the actions of the methods.

Implementations may include one or more of the following features. In one embodiment, the processors are further configured to generate a snapshot backup for each of the one or more user files being monitored pursuant to the one or more rules. In one embodiment, performing the first operation includes restoring the first user file using the snapshot back for the first user file. In one embodiment, the processors are further configured to restore the first user file from a local backup or a cloud back if restoring the first user file with the snapshot fails. In one embodiment, performing the first operation includes terminating the first process if it is determined to be an untrusted process. In one embodiment, monitoring the one or more user files is performed by a file protection driver executing on the one or more processors.

In one embodiment, the one or more heuristics includes one or more databases including data identifying trusted process parameters or trusted processes, wherein the one or more databases are stored in the one or more memory devices. In one embodiment, the one or more heuristics includes one or more databases including data identifying untrusted process parameters or untrusted processes. In one embodiment, the one or more rules include one or more file masks. In one embodiment, detecting when the first process attempts to change a first user file includes receiving a write block of the first process, wherein the first process is a write process. In one embodiment, the processors are further configured to create a backup file of the first user file in response to identifying that the first process is an untrusted process. Implementations of the described techniques may include hardware, a method or process, or computer software on a computer-accessible medium.

DETAILED DESCRIPTION

Overview

In part, the disclosure relates to anti-malware systems, software applications and methods. Various implementations described herein prevent data loss and/or data blocking, and facilitate data restoration if it is necessary. In one embodiment, the implementations combine one or more services that detect ransomware with a backup-and-restore service. This combination better protects against ransomware when compared to relying on antivirus software for such protection.

Figure 1:
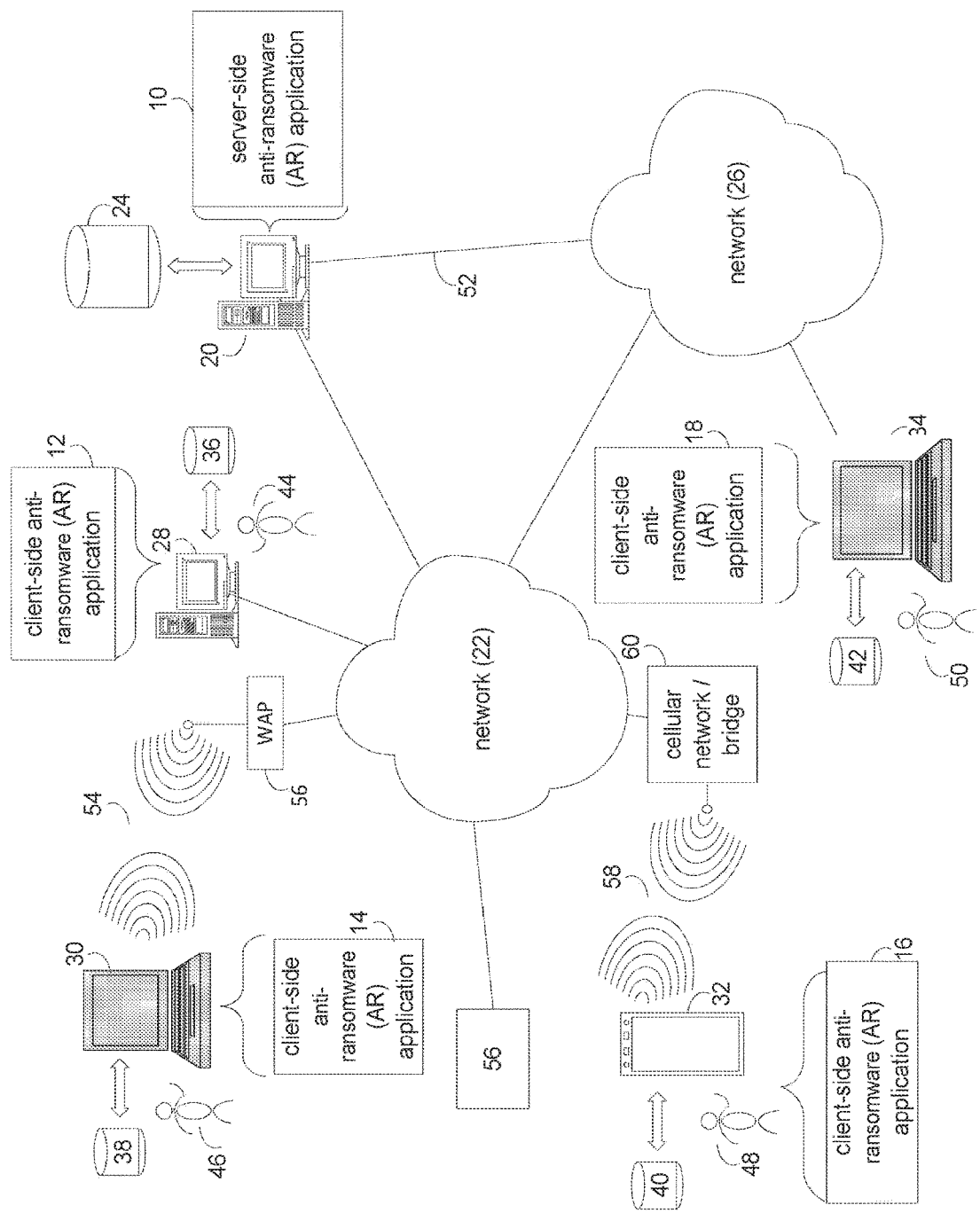
FIG. 1 depicts an example system that can execute implementations of the present disclosure.
Figure 2:
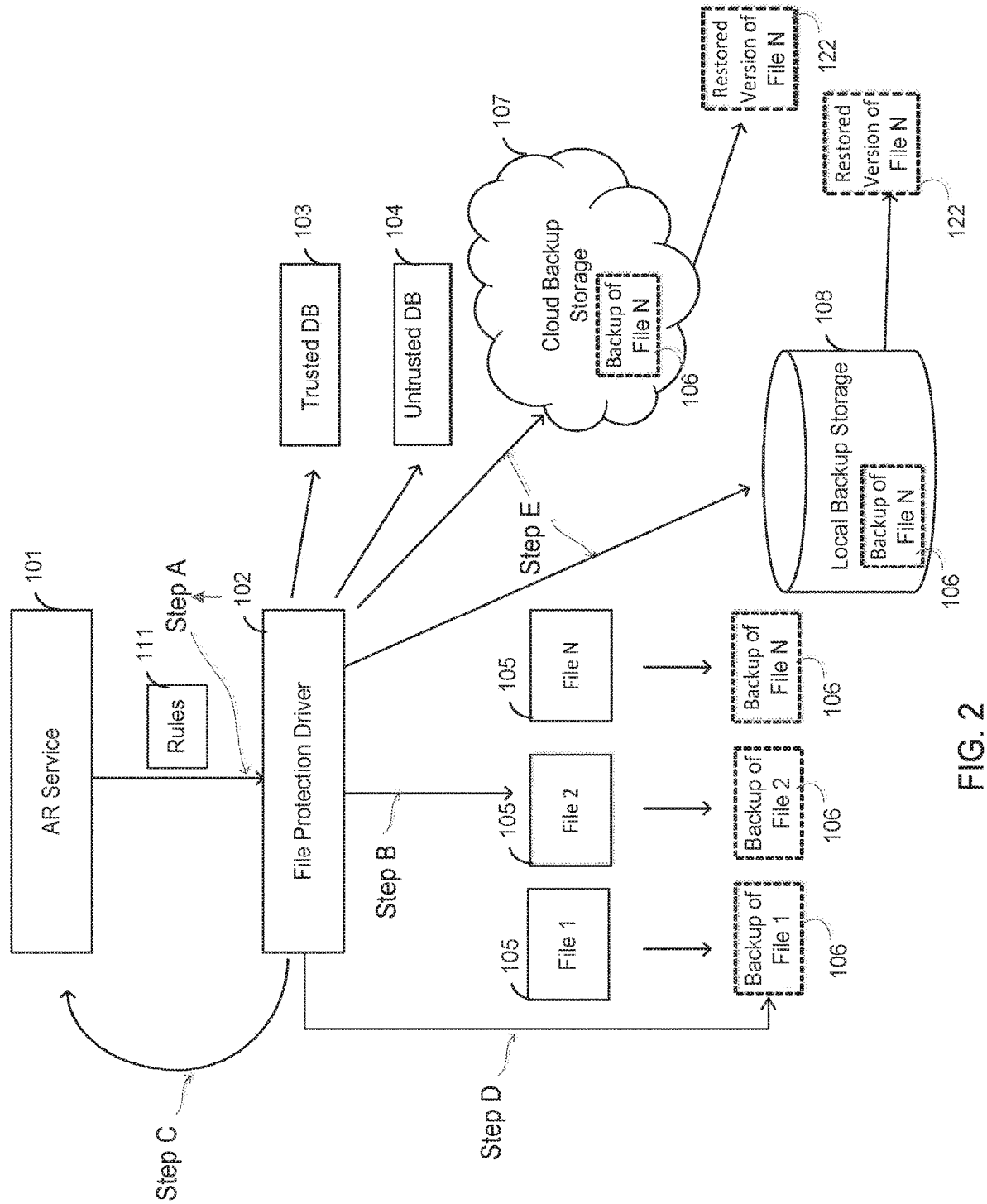
FIG. 2 is a schematic diagram illustrating an example architecture of a software-based system for data protection in accordance with implementations of the present disclosure.

FIG. 1 shows a general system with various computing devices with respect to which one or more implementations of an anti-ransomware (AR) software application can be implemented as a service or otherwise for one or more of the computing devices. An exemplary system with additional implementation details regarding software applications and system components to mitigate the risks of data loss is shown in FIG. 2.

Various AR processes such as software applications or combinations thereof are described herein. These applications and their components use on or more heuristic approaches to identify and distinguish ransomware from trusted software processes. In addition, the AR applications also include data backup and recovery related features. For example, such applications support data recovery for data rendered unavailable by ransomware.

In part, the disclosure relates to methods and systems for improving data security in parallel with active monitoring for malicious activity on or otherwise with regard to a computing device. The system can monitor for local and network based ransomware attacks. In the unfortunate event that data is encrypted or otherwise held hostage by ransomware, the systems and methods disclosed herein include features by which infected data may still be recovered. Accordingly, the features disclosed herein offer advantages above and beyond typical antivirus software and data backup services. Prior to discussing specific details relating to various AR applications or services implementations, it is useful to consider a general computing environment with multiple types of computing devices. Such a general environment is shown in FIG. 1.

Referring to FIG. 1, there is shown a server-side Anti-Ransomware (AR) application or service 10 and client-side AR applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as AR process 10. Further, one or more of client applications 12, 14, 16, and 18 may be referred to as a process configured to carry out one or more of the features described herein, such as AR processes 12, 14, 16, and/or 18.

As will be discussed below and referring now to FIG. 2, AR process, service 101 or application 10, 12, 14, 16, or 18 may monitor for processes executing on one or more computing devices such that they can be evaluated as potential malware threats. The AR process or AR service 101 work in conjunction with a filter protection driver as discussed in more detail herein 102.

With regard to FIG. 1, AR process 10, 12, 14, 16, or 18 may also selectively manage backups of files that are the targets of a malware attack. AR process 10, 12, 14, 16, or 18 may further, in response to determining that an untrusted process is attempting to change one or more parameters of an end user file, generate a backup file of the end user file prior to it being changed. In one embodiment, the backup file of the original end user file includes one or more snapshots of the file. The snapshot can also include other system parameters and information.

The AR process may be a server-side process (e.g., server-side AR process 10), a client-side process (e.g., client-side AR process 12, client-side AR process 14, client-side AR process 16, or client-side AR process 18), or a hybrid server-side/client-side process (e.g., a combination of server-side AR process 10 and one or more of client-side AR processes 12, 14, 16, 18).

System Overview

Referring to FIG. 1, server-side AR process 10 (e.g., in an embodiment, AR service 101 as shown in FIG. 2) may reside on and may be executed by server computer 20), which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially.

For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side AR process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid-state storage device; a RAID array; a random-access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side AR processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side AR processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side AR processes 12, 14, 16, 18 and/or server-side AR process 10 may be processes that run within (i.e., are part of) a cloud computing site, cloud computing application, cloud platform, or cloud environment. Alternatively, client-side AR processes 12, 14, 16, 18 and/or server-side AR process 10 may be stand-alone applications that work in conjunction with the cloud computing site, cloud computing application, cloud platform, or cloud environment. One or more of client-side AR processes 12, 14, 16, 18 and server-side AR process 10 may interface with each other (via network 22 and/or network 26).

Users 44, 46, 48, 50 may access server-side AR process 10 directly through the device on which the client-side AR process (e.g., client-side AR processes 12, 14, 16, 18) is executed, namely client electronic devices 28, 30, 32, 34, for example. Users 44, 46, 48, 50 may access server-side AR process 10 directly through network 22 and/or through secondary network 26. Further, server computer 20 (i.e., the computer that executes server-side AR process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22.

WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

AR Process

For the following discussion, server-side AR process 10 will be described for illustrative purposes and server computer 20 may run server-side AR application 10 to carry out some or all of the techniques and features described here. It should be noted that server-side AR process 10 may interact with client-side AR process 12 and may be executed within one or more applications that allow for communication with client-side AR process 12. However, this is not intended to be a limitation of this disclosure, as other configurations are possible (e.g., stand-alone, client-side AR processes and/or stand-alone server-side AR processes). For example, some implementations may include one or more of client-side AR processes 12, 14, 16, and 18 in place of or in addition to server-side AR process 10. The AR-processes may include or communicate with backup and recovery software applications.

The systems and methods (e.g., AR process 10) described herein relate to the protection of physical or virtual machine backups, archives, data, files, and/or folders from malware attacks such as ransomware attacks by which access to the foregoing by a user is interfered with by involuntary encryption or other means. In part, the systems and methods relate to monitoring of processes based on their type such as whether they are safe or trusted versus unsafe or untrusted.

The systems described herein may include one or more memory elements for backup of software, databases, user data, and physical or virtual machines, and computer storage products including instructions to be executed by a processor to cause the processor to implement the methods described herein. The foregoing processes can be implemented using local and/or remote implementations of the components and steps depicted in FIGS. 2, 3, 4 and/or 5. Data restoration in the event of ransomware encrypting or otherwise interfering with access to data is another feature of the AR process 10.

Referring now to FIG. 1, one or more of users 44, 46, 48, and 50 may be cloud administrators or system administrators or may be cloud or system end-users. Typically, these users have access to or otherwise have stored or data that they wish to safeguard from malware. The cloud or system administrators may access and/or administer server computer 20 or client electronic devices 28, 30, 32, 34 (respectively). In an embodiment one or more of server computer 20 or client electronic devices 28, 30, 32, 34 may be a physical computer system, virtualization host device, or cloud computing client. The data and the processes monitored by the AR applications disclosed herein can reside on any of these and any computing device in general. The virtualization host device may include a virtual machine and may run a cloud or virtualization application such as VMWare™ or may include a bare-metal embedded hypervisor (e.g. VMware™ ESX™ and VMware™ ESXi™).

Further, the virtualization host device may include a vCloud™ architecture that may enhance cooperation between hypervisors. AR processes 10, 12, 14, 16, and/or 18 may include or may work in connection with an agent (e.g., a software module), which may include or may be configured to perform any number of the techniques or features described herein.

AR processes 10, 12, 14, 16, and/or 18 may include a software component, executable code, function, subroutine, or other set of instructions designed to carry out one or more operations for protecting against ransomware, enhancing the detection of ransomware, and otherwise integrating an anti-ransomware service/application with a backup and restore service/application. In one embodiment, one or more software components can be used to safeguard user data by performing operations that include one or more of monitoring a plurality of processes executing on a computing device; and detecting when a first process of the plurality of processes attempts to modify one or more parameters of a user data file.

In addition, the operations can also include determining if first process is a trusted process or an untrusted process; and if the first process is determined to be an untrusted process, create a backup version of the user data file. In one embodiment, the backup version of the user data file is created with regard to an unchanged version the user data file. Also, the backup version is snapshot or other type of data backup file or set of stored information in an embodiment.

In one embodiment, the backup and recovery software applications generate backups of user data files on a periodic schedule such that a backup file such as a snapshot of the file can be identified based on a time stamp or other information. The time stamp or other information can be used to confirm that the backup file identified corresponds to an unchanged original file with a time stamp prior to the detection of activity from an unsafe/untrusted process.

In one embodiment, AR processes operate with one or more services of the operating system for a given computing device to provide the features disclosed herein. The techniques, features, and/or operations described herein increase the security of user data by mitigating the risks associated with a ransomware attack. For example, the techniques, features, and/or operations described herein may allow data to be easily restored that otherwise would remain encrypted as a result of a ransomware attack.

FIG. 2 is a schematic diagram illustrating an example architecture of a software-based system for user data protection. The system of FIG. 2 is designed to monitor for malware threats and to safeguard end user data. As shown, the system includes one or more anti-Ransomware (AR) services 101 and a specialized file protection driver 102. This driver is also referred to as a file protector 102. A given AR service 101 is implemented as one or more software applications. One or more files 105 are the exemplary end user files/data that are being monitored and protected by the AR service 101. In one embodiment, the AR service includes one or more AR applications.

In general, the various components of the system are designed to exchange information and facilitate monitoring of processes to safeguard user data files 105 and the general integrity of the computing system being monitored. The user files 105, for N user files, are shown as files File 1, File 2, . . . , File N. N can be any whole number greater than or equal to 1. In this way, N includes the number of user files being monitored by the systems and methods disclosed herein. Although N files are shown, the systems and methods equally apply to one user file or two user files (N=1, or N=2), without limitation.

In one embodiment, prior to activation and monitoring for malware/ransomware threats, the system is initially configured based upon the computing device(s) on which it will be implemented. Details of such an exemplary configuration process are described with regard to FIG. 2 along with reference to features from FIG. 3.

In one embodiment, the AR service 101 performs a heuristic analysis relative to the processes executing on a computing device's processor or otherwise resident in memory for the computing device or devices the AR service 101 is monitoring. The heuristic analysis of the AR service 101 is configured to identify any suspicious processes that may be malware such as ransomware, root kits, viruses or other untrusted software that presents a risk to user data 105. In one embodiment, the heuristic analysis is performed on a per write basis. The various heuristics described herein, including those relating to write processes, overwrite processes, delete processes, a first process, and the associated blocks and files operated upon or used with the foregoing processes can be used with some of all of the embodiments disclosed herewith. In one embodiment, when a process is determined to be untrusted it is terminated, sandboxed, quarantined, or otherwise handled by the AR service such that it cannot encrypt user files or otherwise interfere with or harm the files, data and software of the computing device being monitored.

Figure 3:
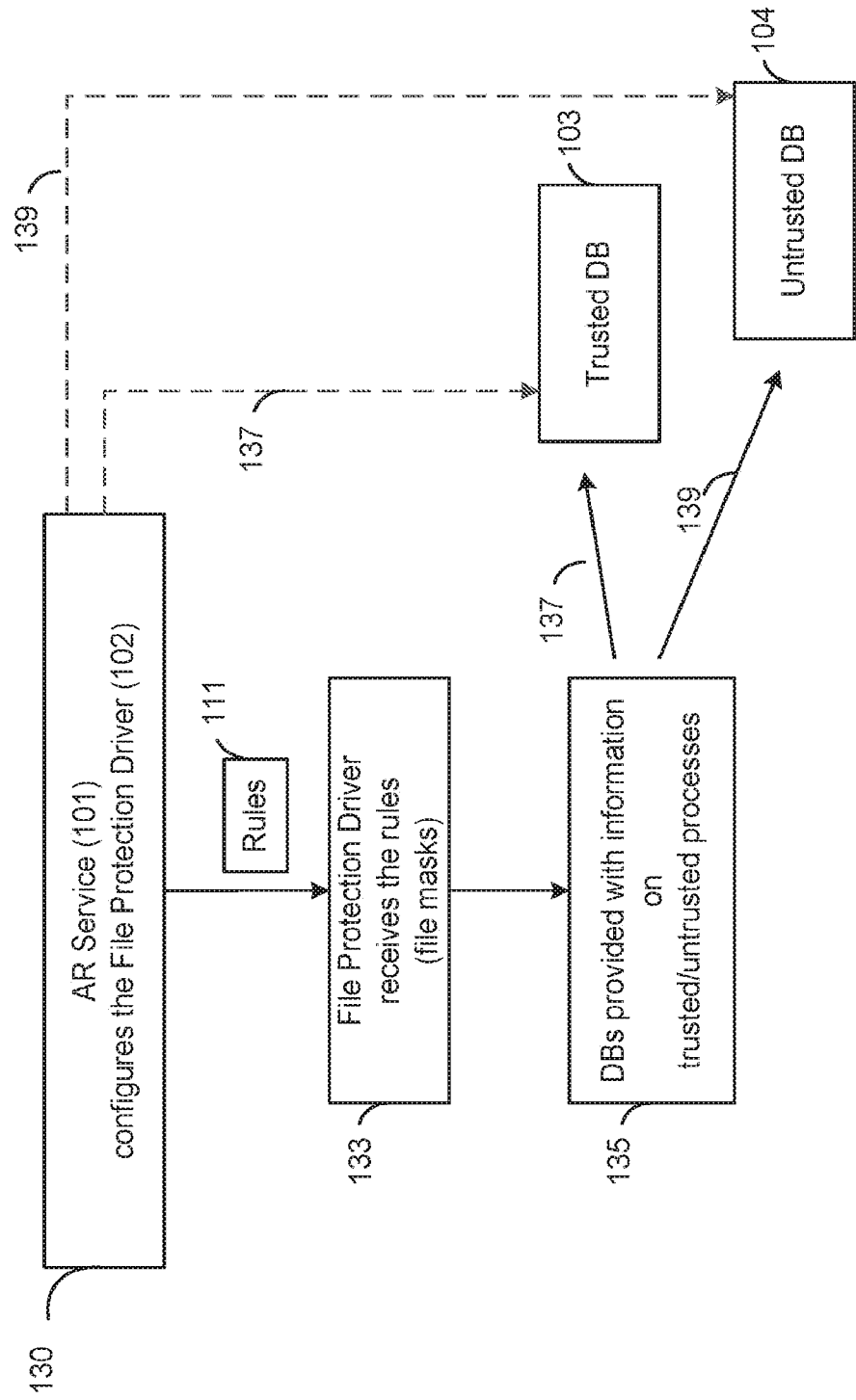
FIG. 3 is a flowchart illustrating exemplary configuration steps involving rules and database configuration suitable for use in a data protection system in accordance with the present disclosure.

FIG. 3 is a schematic diagram of a process of flow depicting the use of rules and configurations options for a given AR service and/or AR application implementation. Initially, a configuration process is implemented before activating the AR service. AR Service (101) configures the File Protection Driver 102 in step 130. In one embodiment, the AR Service 101 sends to file protection driver 102 a set of rules 111 for detecting and monitoring user files (Step A) These rules, file or folder masks in one embodiment, are received by the driver 102 in step 133.

The rules provide a mechanism to identify the set of one or more files or folders that should be monitored. In one embodiment, the rules include file masks, folder masks, or other masks suitable for identifying files or groups of files. In one embodiment, the rules include one or more parameters selected from a group of file parameters, fixed characters, wildcard characters, folder names, file names and combinations and subsets of the foregoing. Usually, the rules include the file masks, types of files which should be monitored, or the lists of the certain files (defined by AR service 101 or by user input).

In one embodiment, as part of the configuration process two databases 103, 104 are provided with information on trusted/untrusted processes as shown in step 135. Also, it is possible to have one embodiment that has one database that holds both trusted and untrusted records. In such an embodiment, rather than database 103, 104, only one database is present that contains records identifying trusted and untrusted processes. In one embodiment, this is performed by driver 102 as shown by data transfers 137 and 139. In one embodiment, the system includes a database (DB) with a list of known trusted processes. As a result, this database is referred to as a trusted database 103 because the information stored in the databases is used to evaluate other processes or other data and identify such other processes or other data as trusted or safe. The trusted database can be used to determine that various data and processes are safe such that further processing and data backups are not necessary. This is contrast to the case in which malware is identified using an untrusted database or other heuristic approach.

In one embodiment, the system includes a database with a list of known untrusted processes. As a result, this database is referred to as an untrusted/unsafe database 104 because the information stored in the database is used to evaluate other processes or other data and identify such other processes or other data as untrusted or unsafe. The untrusted database can be used to flag various data and processes as unsafe. Accordingly, processes or data associated with ransomware or otherwise not identified as trusted by the trusted database can be flagged as a candidate for being associated with ransomware or other malware.

In one embodiment, the database of untrusted processes includes one or more identifiers for processes that are known to be or known to include malware features. Known ransomware processes would thus be included in the database. In one embodiment, the database is automatically updated or updated based on user feedback with new malware identifiers.

In one embodiment, the databases are updated with new entries received from AR Service 101, the file protection driver 102 or from any other sources (public databases of malicious software etc.). In one embodiment, per step 135 of FIG. 3, the file protection driver updates the databases dynamically with information relating to the processes executing on or otherwise interacting with the computing devices monitored by the driver 102.

Referring to FIG. 2, the file protection driver 102 is a software driver configured to monitor any attempts to change user files 105 (Step B). If a process attempts to change a file 104, the file protection driver 102 notifies the AR Service 101 about such attempts (Step C).

Information obtained by the driver 102 or another AR service component can also be transmitted to other software components on the system. In one embodiment, the AR Service 01 is configured to stop, pause or sandbox the untrusted process pending other operations.

Still referring to FIG. 2, the system and methods for safeguarding user data files 105 from ransomware are implemented as part of a data backup and recovery system for such data files 105. In one embodiment, driver 102 creates file backups 106 of files 105 in case of they are changed (Step D). The process of backing up the data files 105 can be implemented by taking snapshots 106 of the user files 105, by implementing local backup storage of the files 105, by implementing a cloud backup storage of the files 105 or other backup or archival processes.

Accordingly, the file backups 106 can include snapshots or other types of backup files. As shown, for the N user files 105 that are being monitored using an AR service and/or AR application, N user back up files (Backup of File 1, ..., Backup of File N) are generated and stored to hedge against a ransomware attack. These backup files 106 can be used to generate restored versions of the user files 122.

In one embodiment, the Cloud Backup Storage 107 is a network-based storage such a cloud-based storage that is local or remote relative to the computing system being protected from ransomware. The Cloud Backup Storage 107 is suitable for storing file backups 106 of files 105. The Local Backup Storage 108 is electronic memory storage that is local relative to the computing system being protected from ransomware suitable for storing file backups 106 of files 105.

In one embodiment, a snapshot of a given file 105 is created by the file protection driver 102 in response to an attempt to change such a given file 105 such as pursuant to Step D. This responsiveness of the driver 102 applies to all files that can be changed by an untrusted process such as a ransomware process.

If the file is subsequently encrypted or otherwise modified by malware, the uncorrupted version of the file can be used to subsequently restore access to the file for a given user. Thus, in one embodiment the file protection driver 102 or another component of the AR system restores one or more of user files 122 from one or more local back up 108 or cloud backup copies 107 (Step E). Typically, the file protection driver 102 operates to restore the user files from one or more of the backup locations in the event there is no other way to access the user files 105.

Figure 4:
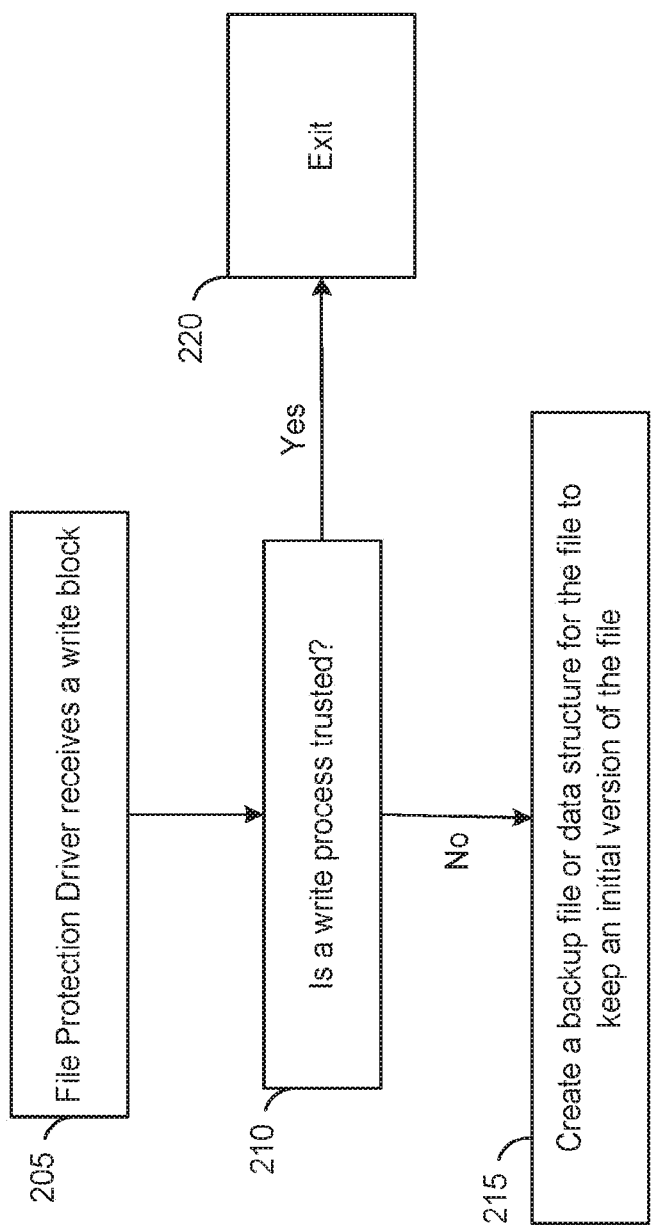
FIG. 4 is a flowchart illustrating an example process for analyzing a process to determine if it is trusted or untrusted in accordance with a data protection system of the present disclosure.

FIG. 4 is a schematic diagram of a process flow by which the AR Service analyzes a monitored process to determine if it is trusted or untrusted. The trusted or untrusted status can be determined using the trusted and untrusted databases discussed herein. As shown in FIG. 4, initially the driver 102 receives a write block from a process running on the computing device or devices being monitored by the AR service (Step 205).

In one embodiment, the write process associated with the write block received by the driver 102 is evaluated to determine if it is a trusted process or an untrusted process (Step 210). If it is a trusted process, there is no further action required and evaluation of the write block terminates or exits (Step 220). If the process is identified as untrusted, a snapshot of the file is created to keep an initial uncorrupted version of a user file 105 (Step 215). Other implementations of logical decisions or loops can be used to assess the status of monitored process over time. Various iterative monitoring cycles can be used to check the status of the monitored processes over time. In addition to using a write process and a write block to determine if a process is a trusted process or an untrusted process, other processes and blocks or files can be used such as a generalized first process and an associated first block or first file operated upon by the first process to provide a heuristic and other mechanisms for evaluating and detecting untrusted processes and events. In one embodiment, the write process may also operate as one or more of a write process, an overwrite process, a delete process and combinations thereof. Any first process and its operation on a block can be monitored and used as the basis for detecting untrusted processed and/or triggering backups of sensitive data. This follows from a process operating in a manner that differs from its normal operation as a possible indication of it being an untrusted process.

In some embodiments a backup file is only created for certain heuristics, even if the detection of an untrusted process does not happen. In other embodiments, a backup file is created for some or all of the heuristics, with or without a detection event as a precaution. Other heuristics can contain more complex patterns on a cross-file basis, but the local backup copy is made for all of them in some embodiments. The patterns can be set based on the order of how files are changed and which files are changed by which processes, for example. If a process interacts with or operates on several files or other processes those interactions and operations can be used to establish such more complex patterns and heuristics.

Further, other heuristics such as a file deletion heuristic can be implemented such that the AR software or its components reads data contents before the deletion by the suspicious process. The heuristic of overwriting the file can also be used to copy and extra information or use it for other purposes. Some of these events and interactions can be used as the pure heuristics. Further, some of the events and interaction may be used as necessary logical points/conditions for making local backups if the triggering operations are performed by the suspicious process. Logical points and conditions rules can be used to create local backups and/or generate alerts and/or to halt processes if/when triggering operations are performed by or associated with a suspicious process.

Figure 5:
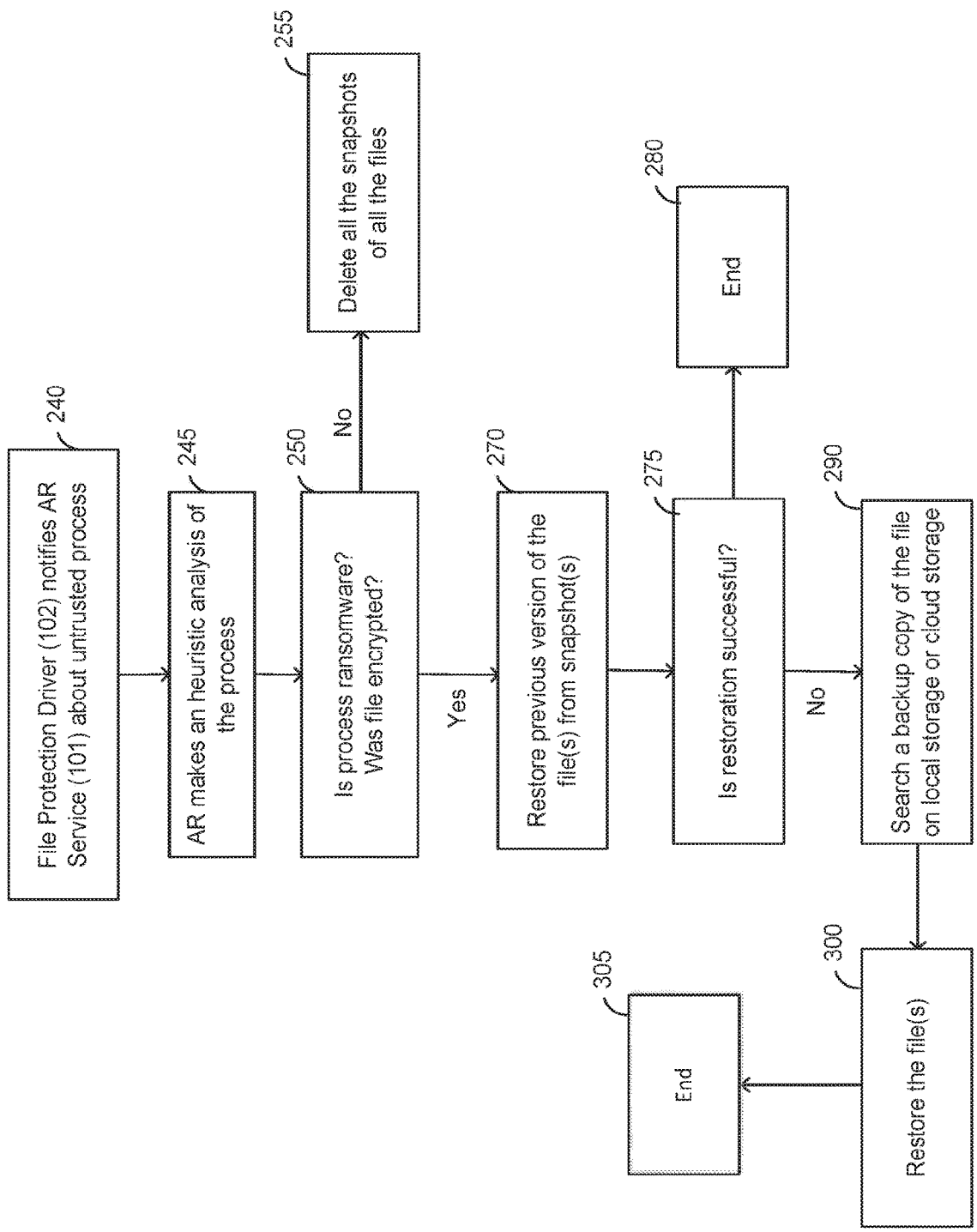
FIG. 5 is a flowchart illustrating exemplary steps by which data encrypted or attempted to be encrypted by malware is restored for a given end user in accordance with the present disclosure.

FIG. 5 is a flowchart illustrating exemplary steps by which data encrypted or attempted to be encrypted by malware is restored. The steps of FIG. 5 are performed as part of the monitoring of processes by the AR service in one embodiment. Initially, in one embodiment, the ransomware protection service starts. In one embodiment, for the user files and/or processes being monitored, backup files 106 are created such as snapshots of all of the user files 105. In one embodiment, a user can identify which files to protect and monitor such as financial records or family photos. These files would then be flagged for backup via snapshots or other backup operations. While the file monitoring associated with the AR service is running, a process executing on one of the monitored computing devices attempts to change at least one of the files 105.

In turn, the driver 102 detects the attempts to changing of the file in the form of write attempt or an actual data write.

In general, once a process has been identified or otherwise flagged as a candidate untrusted process of heuristic analysis of the process is performed (Step 245). For example, in one embodiment, this is performed by one or more candidate processes identified by the driver being compared with the known process listed in trusted/safe DB 103 and untrusted/unsafe DB 104. Other heuristic analyses can be used such as heuristic detection schemes that search for patterns, signatures, definition, file access, encryption operations, and other operations associated with malware and ransomware in particular.

In one embodiment, as part of the evaluation of the process relative to the two databases, the process will be determined to be trusted or untrusted. If the process is trusted, then no further actions are required. Conversely, if the process is untrusted, file protection driver 102 creates one or more backup files of the unchanged file. The one or more backup files can include a copy-on-write snapshot or several snapshots 106 for all the files 105 that were targeted to be changed by the untrusted process. The one or more backup files, for example the snapshot(s), keep the initial version of the file before it has been changed. In some embodiments, all of the files being monitored are backed up as noted above or only files that the user identifies for ransomware protection. This total or user specified backup process can be replaced by or run in parallel with performing file backups when untrusted processes are detected.

Once the initial version of the user data has been effectively preserved, the file protection driver 102 notifies AR Service 101 about the detected untrusted process. After receipt of the notification from the driver, the AR Service 101 analyzes the information received and tries to identify, if the process flagged as untrusted is a malicious process (such as malware, ransomware, etc.) or not.

Still referring to FIG. 5, once the analysis by the AR Service 101 has completed, if the process is recognized or otherwise determined to be a non-malicious process (a trusted process), the AR Service 101 informs file protection driver 102, and the file protection driver 102 deletes the snapshot(s)/backup copies 106 of the file(s) (Step 255). Conversely, if the process is identified as ransomware (Step 257), the method checks to see if a user file was encrypted. If a user file was encrypted, the method restores previous version of the user file(s) 105 from snapshot(s) 106 or other backup files 106 (Step 270). In one embodiment, snapshots of the files, intermediate file information, partial backups, or other backup information is used initially in an attempt to restore the files per Step 270. If these file restorations fail, other file restoration steps can be performed as noted herein.

For example, in one embodiment, the method performs a confirmation to determine if the restoration of the user files was successful (Step 275). If the restoration was a success, the method ends and monitoring of user files continues as before (Step 280). Conversely, if the restoration is not successful, a search for a backup copy of the file on local storage or cloud storage is performed (Step 290). In one embodiment, the method may present a user interface screen to the user to determine if other backups of the encrypted user files exist in another location. Once the files are located pursuant to the search, or otherwise the files are restored (Step 300). At this point in the process, the restoration ends (Step 305). In one embodiment, monitoring of files and the other applicable steps to safe guard against ransomware are performed as described herein.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the disclosure. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the disclosure. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionalities of the systems and methods disclosed herein as a SaaS.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computing device," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except wherein such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, wherein I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures.

In one embodiment, as applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back-end component, e.g., as a data server, or that includes a middleware component, e.g., an application server, or that includes a front-end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance wherein an HTML file is mentioned, other file types or formats may be substituted. For instance, an HTML file may be replaced by an XML, JSON, plain text, or other types of files. Moreover, wherein a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method of safeguarding user data on a computing device, the method comprising:
   specifying one or more rules to identify one or more user files;
   sending one or more rules to the a protection driver, wherein the rules include one or more file masks, folder masks, or other masks;
   monitoring the one or more user files, using the file protection driver, for attempts to change the one or more user files by a first process, wherein the first process is one of a plurality of processes executing on the computing device;

receiving an order of how files are changed by the first process wherein the first process is an overwrite process;

receiving a write block, using the file protection driver, from the first process running on the computing device;

detecting when the first process attempts to change a first user file of the one or more user files;

determining if the first process is a trusted process or an untrusted process using the received write block and one or more heuristics on a per write basis, wherein the one or more heuristics comprises detecting an encryption operation and order of how files are changed;

if the first process is determined to be an untrusted process, quarantining the first process and performing a first operation with respect to the first process or the first user file; and dynamically updating one or more databases, using the file protection driver with information related to the first process for use by the one or more heuristics.

2. The method of claim 1 further comprising generating a snapshot backup for each of the one or more user files being monitored pursuant to the one or more rules in response to an attempt to change such a given file, wherein the snapshot is time stamped with a time stamp, wherein the time stamp is used to confirm that the backup for each of the one or more user files corresponds to an unchanged file with a time stamp prior to detection of the untrusted process.

3. The method of claim 2, wherein performing the first operation comprises restoring the first user file using the snapshot backup for the first user file.

4. The method of claim 3 further comprising restoring the first user file from a local backup or a cloud backup, using the file protection driver, if restoring the first user file with the snapshot fails.

5. The method of claim 1, wherein performing the first operation comprises terminating the first process if it is determined to be an untrusted process.

6. The method of claim 1, wherein the one or more heuristics comprises one or more databases comprising data identifying trusted process parameters or trusted processes.

7. The method of claim 1, wherein the one or more heuristics comprises one or more databases comprising data identifying untrusted process parameters or untrusted processes.

8. The method of claim 1, wherein the one or more rules comprise one or more file masks.

9. The method of claim 1 further comprising creating a backup file of the first user file in response to identifying that the first process is an untrusted process.

10. A system for safeguarding user data the system comprising: comprising one or more processors and one or more memory storage devices, wherein the one or more processors are configured to:

specify one or more rules to identify one or more user files, wherein the rules are stored in the one or more memory storage devices and wherein the one or more rules are sent to a file protection driver;

monitor the one or more user files, using the file protection driver, for attempts to change the one or more user files by a first process, wherein the first process is one of a plurality of processes executing on the one or more processors;

receiving a write block, using the file protection driver, from the first process running on the one or more processors;

detect, using the file protection driver and the write block, when the first process attempts to change a first user file of the one or more user files;

dynamically update, using the file protection driver, one or more databases with information relating to the processes executing on or otherwise interaction with the one or more processors monitored by the file protection driver, wherein the one or more databases include trusted processes and untrusted processes;

notify a anti-ransomware service, using the file protection driver, when the first process attempts to change a first user file of the one or more user files, wherein the anti-ransomware service is integrated with a backup and restore application;

determine if the first process is a trusted process or an untrusted process using one or more heuristics on a per write basis, wherein the one or more heuristics comprises detecting an encryption operation and order of how files are changed; and if the first process is determined to be an untrusted process, perform a first operation with respect to the first process or the first user file.

11. The system of claim 10, wherein the processors are further configured to generate a time stamped snapshot backup comprising a time stamp for each of the one or more user files being monitored pursuant to the one or more rules, wherein the time stamp is used to confirm that the backup for each of the one or more user files corresponds to an unchanged file with a time stamp prior to detection of the untrusted process.

12. The system of claim 11, wherein performing the first operation comprises restoring the first user file using the time stamped snapshot backup for the first user file.

13. The system of claim 12, wherein the processors are further configured to restore the first user file from a local backup or a cloud backup if restoring the first user file with the time stamped snapshot fails.

14. The system of claim 10, wherein performing the first operation comprises terminating the first process if it is determined to be an untrusted process.

15. The system of claim 10, wherein monitoring the one or more user files is performed by a file protection driver executing on the one or more processors.

16. The system of claim 10, wherein the one or more heuristics comprises one or more databases comprising data identifying trusted process parameters or trusted processes, wherein the one or more databases are stored in the one or more memory devices.

17. The system of claim 10, wherein the one or more heuristics comprises one or more databases comprising data identifying untrusted process parameters or untrusted processes.

18. The system of claim 10, wherein the one or more rules comprise one or more file masks.

19. The system of claim 10, wherein detecting when the first process attempts to change a first user file comprises receiving a write block of the first process, wherein the first process is a write process.

20. The system of claim 19, wherein the processors are further configured to create a backup file of the first user file in response to identifying that the first process is an untrusted process.

* * * * *